April 28, 1970   W. J. WILLIAMS   3,508,469
MULTIPLE BALANCED SPRING BRAKE ACTUATOR
Original Filed July 21, 1966
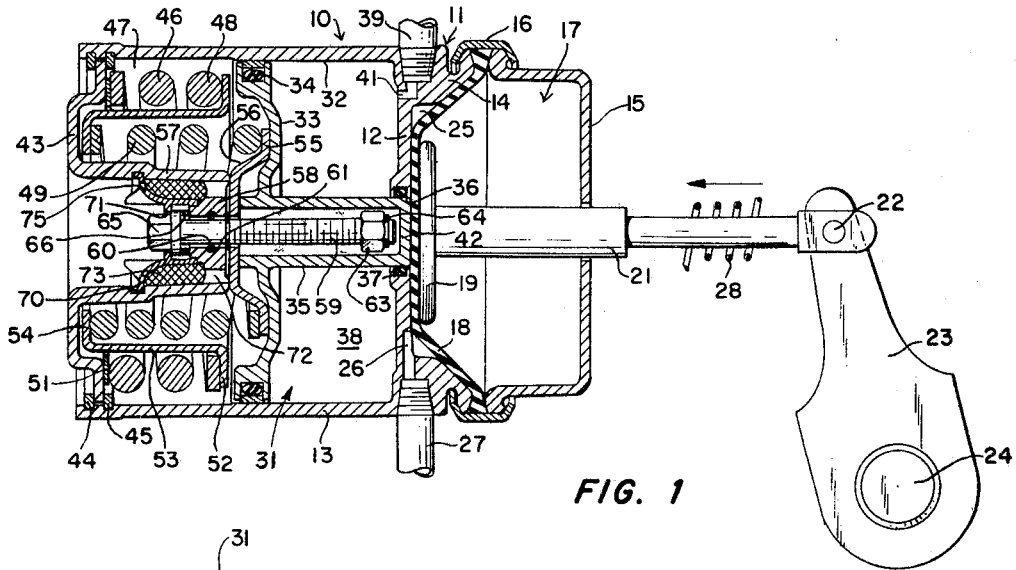
FIG. 1
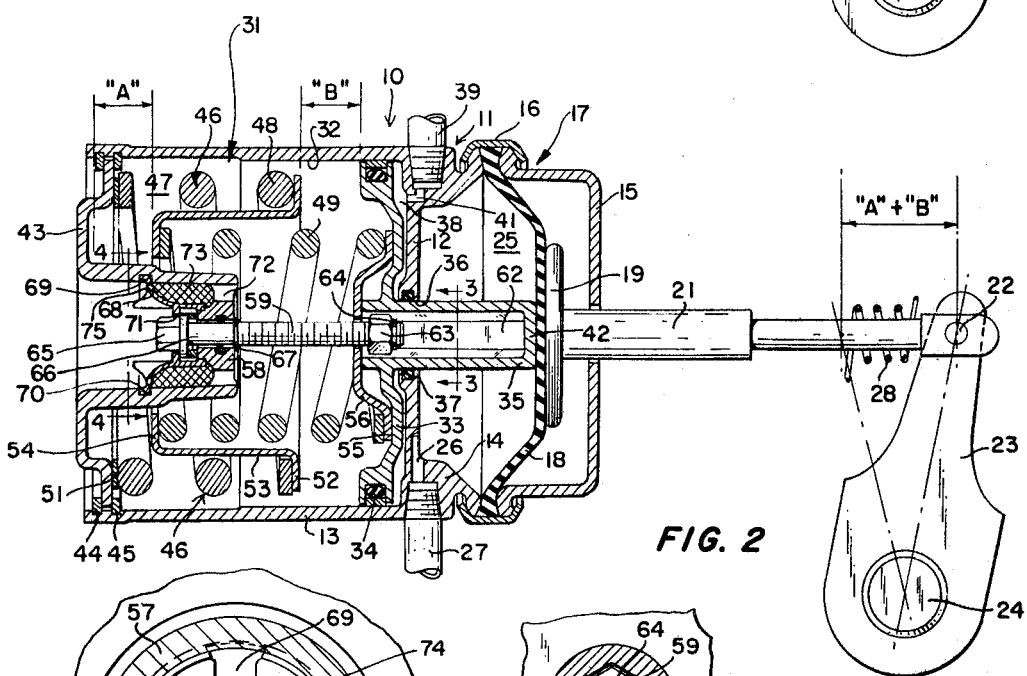
FIG. 2
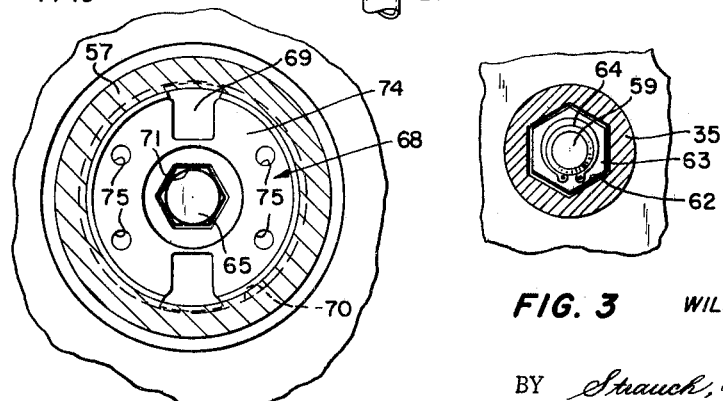
FIG. 4
FIG. 3
INVENTOR
WILLIAM J. WILLIAMS
BY Strauch, Nolan, Neale, Nies & Bronaugh
ATTORNEYS

United States Patent Office 3,508,469
Patented Apr. 28, 1970

3,508,469
MULTIPLE BALANCED SPRING BRAKE ACTUATOR
William J. Williams, Ashtabula, Ohio, assignor, by mesne assignments, to Rockwell-Standard Company, Pittsburgh, Pa., a corporation of Delaware
Continuation of application Ser. No. 566,966, July 21, 1966. This application Oct. 29, 1968, Ser. No. 771,671
Int. Cl. F01b 7/00, 19/02, 31/00
U.S. Cl. 92—63                                                    12 Claims

ABSTRACT OF THE DISCLOSURE

A vehicle brake actuator comprises fluid pressure service and auxiliary motors connected in tandem, the auxiliary motor comprising a piston movably mounted in a housing and having at opposite sides a fluid pressure chamber and a spring chamber containing a spring assembly. The pressure chamber is connected to a source of pressure to displace the piston in one direction to compress and maintain energized the spring assembly. The spring assembly comprises two coaxial coil springs of different diameter having one pair of axially opposite ends reacting against the housing and piston respectively, and the other pair of axially opposite ends disposed in axially coextensive relation with a motion transmitting sleeve mounted on and between them connecting the springs in series.

---

This application is a continuation of application Ser. No. 566,966, filed July 21, 1966, now abandoned.

This invention relates to vehicle brake actuation and more in particular to a combined service and emergency brake actuator of novel construction and mode of operation.

More specifically, the invention provides an improved and technically advanced spring powered emergency and/or parking brake actuator having a novel arrangement of coil springs by which a balanced actuation and increased length of stroke at a minimum spring rate is obtained. In general, the invention constitutes an improvement over the actuator disclosed in U.S. Letters Patent No. 3,136,227 wherein a piston is held retracted by normal reservoir air pressure to compress and maintain energized power spring means that expands for emergency actuation when the reservoir pressure reduces below a safe value.

The ultimate goal of spring powered emergency brake actuators is to provide spring means having a maximum amount of force and stroke length in the brake applied direction, with a minimum of force required to hold the spring means inactive until the emergency arises and with the piston size and the holding pressure maintained at a minimum to keep the unit size as small as possible.

In spite of continual efforts to solve the problem, this goal has not been satisfactorily accomplished heretofore. Attempts prior to the invention have usually produced relatively bulky emergency chamber units which are not readily installed in the most desirable position or available space without alterations on the vehicle. To provide increased holding power, extremely large heavy coil springs have been proposed, and in some proposals a multiple of coil springs are used, sometimes nested one within the other as in United States Letters Patent No. 2,992,630 to F. Leighton et al. These units all required the application of very high hold-off pressure to compress and maintain the springs inactive which holding pressure may be higher than the normal service line pressure needed to apply the brakes, thus sometimes causing the springs to be activated to apply the brakes when the pressure falls below the magnitude of the high holding pressure even though a safe adequate air pressure in the service line may still be available.

Further, in order to increase the stroke length in prior brake actuator mechanisms larger coil springs had to be incorporated which increase the overall size of the unit, which is undesirable. Space considerations are among the prime factors involved in providing brake actuators.

The present invention provides a spring loaded actuator having novel spring arrangements in the emergency brake chamber to hold the overall size of the unit at a minimum and at the same time provide increased stroke capacity, a minimum of required holding air pressure, and increased power when applying the brakes. This is a major object of the invention.

This is accomplished specifically in the preferred embodiment of the invention by the provision of a pair of coil springs of similar characteristics and different diameter partly nested within each other and separated and connected in series by a flanged, floating sleeve against which the springs react in opposite directions so as to balance the spring load exerted by the combined force of the springs, and in which each spring accounts for approximately one-half of the total emergency piston travel, thus considerably reducing the axial space required for the spring means and assuring a low fall-off of spring force during actual operation so that a given force at compressed height produces a maximum output at extended height, assuring spring hold-off at an acceptable level of air pressure.

Accordingly, another object of the present invention resides in the provision of an emergency and/or parking air brake actuator having a chamber containing a pair of springs of substantially equal spring rate floatingly connected to each other so that each spring in expansion accounts for half the total piston stroke but wherein their combined force is not more than the force of a single spring, insuring a minimum hold-off pressure but providing a maximum output for brake application.

Other novel features of the present invention will become apparent or specifically be pointed out in the following detailed description and with reference to the FIGURE 1 is a sectional view showing a brake actuator according to a preferred embodiment of the invention, accompanying drawings in which:
diagrammatically connected to a conventional brake mechanism, the parts being illustrated in brake released position;

FIGURE 2 is a sectional view like FIGURE 1 but showing the parts in brake applied position;

FIGURE 3 is an enlarged section through the emergency piston rod substantially along line 3—3 of FIGURE 2; and FIGURE 4 is a section through the rear cover recess substantially along line 4—4 of FIGURE 2.

In the preferred embodiment the actuator unit 10 comprises a main housing 11 which is preferably a unitary metal casting having a transverse wall 12. An open ended cylinder 13 projects from one side of wall 12, and a cup-shaped flange 14 projects from the other side of wall 12. A cup-shaped end member 15 is secured over the open end of flange 14 as by a clamping ring 16 to complete the housing of the service motor 17 of the actuator unit.

A flexible service diaphragm 18 has its periphery clamped fluid tight between flange 14 and cup 15, and it is engaged at the side opposite wall 12 by a wide area pressure plate 19 on the end of a push rod 21 that extends freely through an aperture in cup 15 for pivotal connection at 22 to a slack adjuster or like lever 23 fixed on a brake camshaft 24.

This connection of the service motor of the actuator to the vehicle wheel brake may be the same as that disclosed in U.S. Letters Patent No. 3,037,584 for example.

Alternatively, push rod 21 may be connected to the wedge of a wedge actuated brake such as that disclosed in said Patent No. 3,136,227, Service motor 17 comprises a pressure chamber 25 between wall 12 and diaphragm 18, and this chamber is connected through port 26 and a conduit 27 to the usual source of air pressure in the vehicle controlled by a foot pedal valve accessible to the operator (not shown). During operation of the service motor, air under pressure is introduced into chamber 25 causing diaphragm 18 and push rod 21 to be displaced to the right in FIGURE 1 toward the position shown in FIGURE 2 to rock camshaft 24 clockwise to apply the service brakes in a conventional manner. In the brake disengaged position of FIGURE 1, diaphragm 18 is urged against wall 12, as by the force of the usual brake return springs or other biasing springs in the system all shown diagrammatically at 28 and acting in the direction of the arrow in FIGURE 1.

Cylinder 13 defines the major part of the housing of the auxiliary emergency or parking motor 31 of the actuator unit, and it contains an internal cylindrical surface 32 slidably mounting a reciprocable piston 33 having a peripheral sealing assembly 34 engaged with surface 32.

At one side piston 33 is formed with a hollow stem 35 that projects slidably into a central opening 36 of housing wall 12. A suitable fluid tight seal unit 37 in opening 36 slidably surrounds the piston stem. In the brake disengaged position of the parts shown in FIGURE 1, the emergency air pressure chamber 38 between piston 33 and wall 12 contains the full air pressure of the vehicle air pressure reservoir applied through conduit 39 and port 41, and in this position the closed end 42 of piston stem 35 is substantially flush with the service air pressure side of wall 12 in abutment with the service diaphragm 18 on the opposite side from pressure plate 19. Seal 37 prevents loss of air pressure from chamber 38 through wall opening 36.

The open end of cylinder 13 is closed by housing end member 43 that has its periphery axially confined between snap rings 44 and 45 disposed in suitable grooves in the cylinder wall, and spring means 46 compressed by the retracted piston 33 of FIGURE 1 is disposed in the spring chamber 47 between the other side of piston 33 and end member 43.

Spring chamber 47 contains two concentric cylindrical coil springs 48 and 49 of different diameter, disposed in substantially nesting relation. Outer spring 48 extends axially between a wear washer 51 seated against the inner surface of housing end member 43 and the outwardly turned axially inner radial flange 52 of a floating sleeve 53 in the spring chamber. Inner spring 49 extends between the inwardly turned axially outer radial flange 54 of sleeve 53 and an annular washer 55 which seats against piston 33. The central part of washer 55 preferably bears against the open end of the hollow piston stem and is substantially cone-shaped as shown at 56 to extend within and pilot the adjacent end of spring 49. Sleeve 53 connects springs 48 and 49 in series The central part of housing end member 43 is formed with a reentrant hollow boss 57 having an end wall 58. Boss 57 extends freely through the axially outer open end of sleeve 53 as shown. A threaded rod 59 extends rotatably through an opening 61 in boss end wall 58 and freely through washer 55 into the open end of hollow piston stem 35. An O-ring seal 60 in opening 61 surrounds the rods.

The interior of piston stem 35 is non-circular, preferably hexagonal as shown in FIGURE 3 at 62, for axially slidably non-rotatably mounting a nut 63 on the inner end of rod 59. The inner side of nut 63 is engaged by a retaining lock ring 64 snap fitted onto rod 59 to prevent nut 63 from leaving rod 59.

The outer end of rod 59 is an enlarged hexagonal head 65 formed to be turned by a wrench or the like, and a hard steel washer 66 provides a bearing between the inner side of head 65 and one side of the boss end wall when rod 59 is rotated. An axially fixed snap ring 67 mounted in a groove on rod 59 rotatably slidably abuts the other side of the boss end wall, so that when rod 59 is rotated about its axis it does not shift axially with respect to housing end member 43.

An annular sheet metal retainer plate 68 has at its periphery lugs 69 snapped into a groove 70 within boss 57. Plate 68 is formed with a central hexagonal opening 71 adapted to surround the head of rod 59 whereby accidental rotation of rod 59 due to vibration and the like during normal operation of the vehicle is prevented.

In order to permit breathing of spring chamber 47 which is at atmospheric pressure during operation, the boss end wall is formed with a series of openings 72, and the outer ends of these openings are covered by a tubular air filter 73, which is preferably a plastic foam element confined between the retainer 68 and the boss 57. Retainer 68 has a rim 74 formed with a series of openings 75 (FIGURE 4) which communicate the outer end of the filter with atmosphere.

Springs 48 and 49 preferably have the same spring rate and identical load characteristics. Since springs 48 and 49 are connected in series by the floating sleeve 53, the force required to be exerted by piston 33 to compress both springs to the FIGURE 1 condition is the same as would be required to compress a single spring. Due to the nested relation of the springs, the spring assembly collapses so that the inner spring is disposed substantially entirely within the confines of the outer spring in the fully compressed condition of FIGURE 1, so that in the fully collapsed condition of the spring assembly the axial dimension of the spring assembly is substantially the same as that of each individual spring, and in the expanded brake applying condition of FIGURE 2, the springs remain partially coextensive axially. In this manner the compact spring arrangement of the invention additively utilizes the extension ability of the two springs, without requiring an excessive spring compression holding force while the air presence system of the vehicle is adequate for normal service brake operation.

In normal operation while the air pressure in the system reservoir is at an adequate level, normal service brake operation takes place by controlling admission and ejection of air under pressure at service chamber 25 as usual. During this time the holding air pressure in chamber 38 keeps the piston 33 retracted and the springs 48 and 49 compressed as shown in FIGURE 1.

Should the system air pressure be lost, as due to a reservoir leak or failure, the pressure in chamber 38 will drop allowing the springs 48 and 49 to simultaneously expand at the same rate and drive piston 33 and diaphragm 18 to the right toward the brake applied position shown in FIGURE 2.

During this spring expansion the outer spring 48 expands to move sleeve 53 an axial distance indicated at "A" in FIGURE 2, thereby displacing inner spring 49 a like amount, and expansion of the inner spring 40 displaces the piston 33 an axial distance "B" equal to "A" in the assembly. Thus, the two springs combine to displace piston 33 the distance $A+B$ and the fall-off of spring force at the end of expansion in each individual spring is held to minimum since each spring effectively accomplishes only half of the actual piston stroke. Each spring 48 and 49 thus imparts a piston displacement force during the portion of spring expansion wherein the spring force is greatest and substantially constant.

During operation sleeve 53 which is carried by and between the springs connects the springs 48 and 49 in pressure balanced assembly, the spring force at opposite ends of the sleeve being equal. Sleeve 53 also acts to help retain springs 48 and 49 in their telescoped nested relationship in the assembly.

When it is desired to release the brakes after a nemergency operation to the condition of FIGURE 2, retainer 68 is removed, and a wrench is applied to head 65 to rotate rod 59. As rod 59 rotates nut 63, which is held against rotation by the piston stem and the high spring force on the piston, moves to the left in FIGURE 2 engaging washer 55 and compressing the spring assembly between washer 55 which serves as a retainer and housing end member 43. Since washer 55 is separable from piston 33, the spring assembly may thereby be clamped in compressed condition to housing end member 43 for removal during service and repair while the piston remains in the cylinder. As this continues, the brake return springs are enabled to displace the piston to the left in FIGURE 2 and eventually disengage the brakes.

Now the snap ring 44 can be removed, and housing end member 43 can be pulled out of the housing with the springs safely clamped upon it, thus avoiding the danger of sudden spring expansion to the mechanic.

Where the actuator is used as a parking brake, conduit 39 is connected to the vehicle air pressure reservoir through a suitable manually controlled valve (not shown) accessible to the vehicle operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foegoing description, and all changes which come within the meaning and range of equivalency of the claims are therefore intended to be embraced therein.

I claim:

1. A vehicle brake actuator comprising fluid pressure service and auxiliary motors connected in tandem, said service motor comprising a fluid pressure responsive element operatively connected to brake mechanism and including means for introducing fluid pressure to displace said element in the brake applying direction, and said auxiliary motor comprising a housing, a fluid pressure responsive member movably mounted in said housing, there being within said housing a fluid pressure chamber at one side of said fluid pressure responsive member and a spring chamber containing a spring assembly at the other side of said fluid pressure responsive member, said pressure chamber being adapted for connection to a source of fluid under pressure to displace said fluid pressure responsive member in one direction to compress and maintain energized said spring assembly, said spring assembly comprising two relatively short coaxial coil springs of different diameter having one pair of axially opposite ends reacting against an end of said housing and said fluid pressure responsive member respectively, and the other pair of axially opposite ends disposed with a floating motion transmitting member mounted on and between them connecting said springs in series, said motion transmitting member being wholly supported by said springs in all operative positions of said fluid pressure responsive member, means independent of said motion transmitting member for arresting displacement of said fluid pressure responsive member in said one direction, said floating motion transmitting member being of such length as to remain floating between said springs, end of said housing, and fluid pressure responsive member when said fluid pressure responsive member has been displaced by fluid pressure to seat against said arresting means, and means for operatively connecting said pressure responsive member to said element so that when the pressure in said pressure chamber is reduced to allow said energized spring assembly to exapnd said fluid pressure responsive member is displaced opposite to said one direction within said pressure chamber and is effective for displacing said service motor element in the brake applying direction under power derived from the expanding spring assembly.

2. In the vehicle brake actuator defined in claim 1, said fluid pressure responsive member being a slidable piston, and said spring assembly having an axially separable connection to said piston.

3. In the vehicle brake actuator defined in claim 1, said springs having substantially the same spring rate and load characteristics.

4. In the vehicle brake actuator assembly defined in claim 1, said means for arresting displacement of said fluid pressure responsive member comprising a tubular member rigid with said housing end projecting within said spring assembly sufficiently to provide a stop limiting displacement of said fluid pressure responsive member in said one direction.

5. In the vehicle brake actuator defined in claim 4, said spring assembly comprising an end retainer within said spring chamber that engages said fluid pressure responsive member and is forced into engagement with the end of said tubular member when said fluid pressure responsive member has been displaced its limit in said one direction.

6. In the vehicle brake actuator defined in claim 1, the larger diameter spring engaging said housing end and said motion transmitting member being a sleeve extending axially between the springs and said sleeve having at its axially outer end an inturned flange engaging the end of the smaller diameter spring and at its axially inner end an out-turned flange engaging the end of the large diameter outer spring.

7. In the vehicle brake actuator defined in claim 6, an annular spring end retainer axially interposed between the end of the smaller diameter inner spring and said fluid pressure responsive member and thereby being resiliently held against said piston.

8. In the vehicle brake actuator defined in claim 1, said pressure responsive member being a piston with a hollow stem having a closed end extending into abutment with said fluid pressure responsive element of the service motor and an open end facing said spring assembly, and said housing end comprising a removable wall structure having a central reentrant hollow boss, a spring assembly retracting rod rotatably mounted in said removable wall structure with an operating head disposed within the boss and a threaded end extending into the hollow stem of said piston and a nut on said threaded rod end slidably non-rotatably mounted in said piston stem.

9. A vehicle brake actuator comprising fluid pressure service and auxiliary motors connected in tandem, said auxiliary motor comprising a fluid pressure responsive member movably mounted in a housing having a fluid pressure chamber at one side of said member and a spring chamber containing a spring assembly at the other side of said member, said pressure chamber being adapted for connection to a source of fluid under pressure to displace said member in one direction to compress and maintain energized said spring assembly, and said spring assembly comprising two relatively short coaxial radially spaced coil springs of different diameter having one pair of axially opposite ends reacting against said housing and said member respectively, and the other pair of axially opposite ends disposed with a floating motion transmitting sleeve mounted on and between them connecting the springs in series, means providing a removably mounted end wall on said housing defining the outer end of said spring chamber, a substantially central tube fixed to said end wall projecting into said spring chamber within the outer end of the smaller diameter spring, means seating the outer end of one of said springs on said end wall and the inner end of the other of said springs on said fluid pressure responsive member, means mounting said motion transmitting sleeve to extend through the radial space between said springs with opposite ends connected to the respective springs, said sleeve being of such length as to remain floating between said springs, end wall, and fluid pressure responsive member when said fluid pressure responsive member has been displaced by fluid pressure to seat against the end of said tube, and means for selectively securing both of said springs in compressed condition in surrounding relation to said tube and on said end wall.

10. A vehicle brake actuator comprising fluid pressure service and auxiliary motors connected in tandem, said service motor comprising a fluid pressure responsive element operatively connected to brake mechanism and including means for introducing fluid pressure to displace said element in the brake applying direction, and said auxiliary motor comprising a housing having a removable end member, a fluid pressure responsive member movable mounted in said housing, there being within said housing a fluid pressure chamber at one side of said member and a spring chamber containing a spring assembly at the other side of said fluid pressure responsive member, said pressure chamber being adapted for connection to a source of fluid under pressure to displace said fluid pressure responsive member in one direction to compress and maintain energized said spring assembly, said spring assembly comprising two relatively short coaxial and at least partly coextensive coil springs disposed with a motion transmitting member mounted on and between the pair of axially adjacent ends of said springs to connect said springs in series, an annular spring end retainer interposed between said fluid pressure responsive member and one of the pair of axially opposite ends of said spring assembly, the other of said pair of axially opposite ends of said spring assembly reacting against said housing end member, means for operatively connecting said pressure responsive member to said element so that when the pressure in said pressure chamber is reduced to allow said energized spring assembly to expand said pressure responsive member is displaced opposite to said one direction within said pressure chamber and is effective for displacing said element in the brake applying direction under power derived from the expanding spring assembly, and manually operable clamp means comprising an axially fixed first part rotatably mounted in said housing end member and extending freely through said spring assembly and said spring end retainer to terminate in a section having rotatable threaded engagement with a second part non-rotatably but axially slidably mounted on said fluid pressure responsive member so that upon rotation of said first clamp part said spring assembly may be compressed between said retainer and said housing end member and removal of the housing end member extracts the compressed spring assembly from said housing.

11. In a brake actuator comprising a housing, a removable end wall on said housing, means defining a cylinder within said housing, a piston slidable in said cylinder, means connecting said piston for effecting brake application when displaced in one direction, means for introducing fluid under pressure into said cylinder at one side of said piston to displace said piston opposite to said one direction, a spring retainer abutting against the other side of said piston, compression spring means in said housing having one end engaging said end wall and the other end engaging said retainer, so that when said piston is displaced in said opposite direction said spring means is compressed to energized condition, means defining a non-circular recess in said piston having an open end facing said housing end wall, a clamp element non-rotatably and slidably mounted in said recess and having a threaded bore, and an axially fixed rod rotatably mounted in said housing end wall projecting freely through an aperture in said retainer and having a threaded end within said bore, said clamp element being larger than the aperture in said retainer whereby rotation of said rod will cause displacement of said clamp element toward said end wall to clamp said spring means in compressed condition between said retainer and said end wall.

12. A vehicle brake actuator comprising fluid pressure service and auxiliary motors connected in tandem, said auxiliary motor comprising a fluid pressure responsive member movably mounted in a housing having a fluid pressure chamber at one side of said member and a spring chamber containing a spring assembly at the other side of said member, said pressure chamber being adapted for connection to a source of fluid under pressure to displace said member in one direction to compress and maintain energized said spring assembly, and said spring assembly comprising two coaxial coil springs of different diameter having one pair of axially opposite ends reacting against said housing and said member respectively, and the other pair of axially opposite ends disposed with a motion transmitting member mounted on and between them connecting the springs in series, a removable end wall on said housing having a reentrant hollow boss provided with an apertured bottom wall, a spring assembly retracting rod rotatably mounted in said bottom wall with an operating head disposed within the boss and a threaded end extending into a hollow stem on said piston, a nut on said threaded rod end slidably non-rotatably mounted in said piston stem, a retainer mounted in said boss for holding the operating head of said rod against accidental rotation, and an air filter mounted between the retainer and boss over the apertured part of said wall.

References Cited

UNITED STATES PATENTS

| 1,111,924 | 9/1914 | Smith | 267—60 |
| 1,825,093 | 9/1931 | Sansburn | 267—60 |
| 2,796,856 | 6/1957 | Gratzmuller. | |
| 3,117,496 | 1/1964 | Dobrikin | 92—63 |

MARTIN P. SCHWADRON, Primary Examiner

I. C. COHEN, Assistant Examiner

U.S. Cl. X.R.

92—64, 128, 130

PO-1050
(5/69)

UNITED STATES PATENT OFFICE
CERTIFICATE OF CORRECTION

Patent No. 3,508,469          Dated April 28, 1970

Inventor(s) WILLIAM J. WILLIAMS

It is certified that error appears in the above-identified patent and that said Letters Patent are hereby corrected as shown below:

Col. 2, line 44 should be line 42.

Col. 4, line 43, change "presence" to -- pressure --.

Col. 4, line 60, change "40" to -- 49 --.

Col. 5, lines 1 and 2, change "a nemergency" to -- an emergency --.

Col. 5, line 69, change "exapnd" to -- expand --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents